US00RE36588E

United States Patent [19]

Tisbo et al.

[11] E Patent Number: Re. 36,588

[45] Reissued Date of Patent: Feb. 29, 2000

[54] SNOW REMOVAL TOOL

[75] Inventors: Thomas A. Tisbo, Barrington Hills; Stephen P. Whitehead, Elgin, both of Ill.

[73] Assignee: Suncast Corporation, Batavia, Ill.

[21] Appl. No.: 08/693,799

[22] Filed: Aug. 1, 1996

Related U.S. Patent Documents

Reissue of:

[64] Patent No.: 5,419,600
Issued: May 30, 1995
Appl. No.: 08/304,122
Filed: Sep. 12, 1994

[51] Int. Cl.[7] ..... E01H 5/02

[52] U.S. Cl. ..... 294/54.5; 37/285; 294/57

[58] Field of Search ..... 294/49, 54.5, 56–59; 16/110 R, 111 R, 114 R, 116 R; 37/241, 265, 266, 284, 285; D8/10

[56] References Cited

U.S. PATENT DOCUMENTS

| | | | |
|---|---|---|---|
| D. 213,630 | 3/1969 | Hoxie et al. . | |
| D. 214,662 | 7/1969 | Portz | D8/10 |
| D. 257,210 | 10/1980 | Bonnes | 294/54.5 X |
| D. 267,468 | 1/1983 | Simms | 294/54.5 |
| D. 269,490 | 6/1983 | Germain | D8/1 |
| D. 284,733 | 7/1986 | Hozumi | D8/10 |
| D. 291,863 | 9/1987 | Kolonia | D8/10 |
| D. 296,410 | 6/1988 | Abbott | 294/54.5 X |
| D. 306,962 | 4/1990 | Schuele | D8/13 |
| D. 328,553 | 8/1992 | Norton et al. | 294/54.5 |
| D. 331,652 | 12/1992 | Wu | D34/27 |
| D. 350,166 | 8/1994 | Kino | D21/120 |
| D. 360,564 | 7/1995 | Tisbo et al. | D8/10 |
| D. 363,563 | 10/1995 | Tisbo et al. | 294/49 |
| 366,099 | 7/1887 | Hinchman | 294/56 |
| D. 384,559 | 10/1997 | Tisbo et al. | D8/10 |
| D. 384,866 | 10/1997 | Tisbo et al. | D8/10 |
| D. 385,160 | 10/1997 | Tisbo et al. | D8/10 |
| 678,373 | 7/1901 | Blaser . | |
| 864,338 | 8/1907 | Schertzer . | |
| 930,660 | 8/1909 | Gifford | 294/54.5 |
| 964,453 | 7/1910 | Robarge . | |
| 967,270 | 8/1910 | Tiedt | 294/54.5 X |
| 1,042,352 | 10/1912 | Kohler | 294/54.5 |
| 1,260,276 | 3/1918 | Miller | 294/54.5 |
| 1,435,061 | 11/1922 | Halsey . | |
| 1,839,285 | 1/1932 | Winkie . | |
| 1,931,349 | 10/1933 | Habig . | |
| 3,119,596 | 1/1964 | Pratt | 254/131.5 |

(List continued on next page.)

FOREIGN PATENT DOCUMENTS

| | | | |
|---|---|---|---|
| 234243 | 12/1959 | Australia . | |
| 1043057 | 11/1978 | Canada . | |
| 1261670 | 9/1989 | Canada . | |
| 2285163 | 4/1976 | France . | |
| 641210 | 8/1933 | Germany . | |
| 687817 | 1/1940 | Germany . | |
| 369590 | 3/1939 | Italy . | |
| 1009947 | 11/1965 | United Kingdom | 294/58 |
| 1173714 | 12/1969 | United Kingdom | 294/57 |
| 1424565 | 2/1976 | United Kingdom | 294/57 |
| 2063142A | 6/1981 | United Kingdom . | |

*Primary Examiner*—Johnny D. Cherry
*Attorney, Agent, or Firm*—Welsh & Katz, Ltd.

[57] ABSTRACT

Disclosed is an improved snow shovel having a graphite in-laid polyethylene blade with outwardly propagating reinforced ribs providing a flex resistant blade of minimal thickness. A shaft of the shovel is constructed of a low cost steel pipe covered with a polyethylene sleeve with knurled grip surfaces. The sleeve conforms to the pipe diameter upon application of heat during manufacture. A one-piece handle is attached to the free end the shaft. For storage purposes a cutout is provided on a top edge of each shovel allowing nesting of similarly shaped shovels. A straight blade shovel and a pusher type shovel are two embodiments disclosed herein.

14 Claims, 3 Drawing Sheets

U.S. PATENT DOCUMENTS

| | | | |
|---|---|---|---|
| 3,177,026 | 4/1965 | Cowan | 294/54.5 |
| 3,680,641 | 8/1972 | Hein | 172/371 |
| 4,149,744 | 4/1979 | Bonnes | 294/54.5 |
| 4,247,141 | 1/1981 | Grint | 294/49 |
| 4,280,727 | 7/1981 | Germain | 294/54 |
| 4,538,847 | 9/1985 | Lapshansky | 294/51 |
| 4,655,494 | 4/1987 | Eads et al. | 294/49 |
| 4,690,447 | 9/1987 | Adams | 294/57 |
| 4,848,073 | 7/1989 | Germain et al. | 56/400.17 |
| 4,878,704 | 11/1989 | Jacanin, Jr. et al. | 294/54.5 |
| 4,991,324 | 2/1991 | Fine et al. | 294/54.5 X |
| 4,993,768 | 2/1991 | Ewen | 294/51 |
| 5,228,734 | 7/1993 | Pollasto | 294/54.5 |
| 5,419,600 | 5/1995 | Tisbo et al. | 294/54.5 |
| 5,435,063 | 7/1995 | Russo | 30/164.5 |

SNOW REMOVAL TOOL

Matter enclosed in heavy brackets [ ] appears in the original patent but forms no part of this reissue specification; matter printed in italics indicates the additions made by reissue.

FIELD OF THE INVENTION

This invention relates generally to hand tools and, more particularly, to shovels used for removal of snow and the like substance.

BACKGROUND OF THE INVENTION

The shovel is a well known hand tool used primarily for transfer of loose objects from one location to another. Despite the use, a primary concern with shovel design is the strength to weight ratio. Typically the stronger a shovel, the heavier it is, due to the amount of material mass required for rigidity. For instance, the blade of a shovel made from steel is suitable for transferring of heavy material. However, the weight of steel becomes critical if the blade is to be lifted, especially if the person lifting the blade is not trained in proper lifting techniques. If the blade is made too thin, it will bend under load. Thus, a shovel constructed from steel is typically of a thickness to make the weight noticeable creating a hand tool that is hefty to operate.

Further, since a shovel blade is used to move material, it is constantly subjected to abrasion which will quickly deteriorate even high quality finishes. This leads to premature failure of the tool especially in areas of the country where the tool is used for snow removal. The combination of moisture and possible road salt can quickly rust steel tools.

A shovel used primarily for snow removal is unique in that the consumer seeks as large a blade as possible yet demands minimal weight. For this reason, in place of a steel blade manufacturers now provide alternative materials such as aluminum and plastic. It is noted that while aluminum does not rust it is much weaker than steel and requires either sufficient thickness or steel reinforcement in order to withstand the strain. Without reinforcement of an aluminum blade to prevent counter-flexing, such as stepping on the back of the blade, the aluminum blade can easily bend in half thereby ruining the tool.

Another problem with the shovels of the prior art is that the shaft and associated handle further add to the weight of the tool leaving manufacturers to try to remedy the situation with various types of materials. In this instance steel is most suitable when used as tubing but is not used due to weight for the shaft and handle due to the inability to compensate for the retainment of the surrounding ambient temperature when used during frigid months. Further, since a steel shaft and handle must be painted, the operator can easily wear off the coating since both must be grasped in an abrasive manner quickly leading to rust abrasion.

Common practice is to make the shaft from wood and to rivet a section of wood to the handle. However, a problem with wood is that unless properly treated, water can rot the wood especially where the components are coupled together. While it is possible to replace the wood, it is more likely that the tool will be disposed of.

The blade, shaft and handle of a shovel can also be constructed from plastic which does not rot, rust, or retain cold as its wood and steel counterparts. However, the problem with plastic is strength. A plastic shaft may flex causing the shaft to bend since the shaft becomes a fulcrum point during use. A blade made of plastic further presents a number of problems including control of flexing and wear.

U.S. Pat No. 4,280,727 discloses a one piece plastic injected molded snow shovel in which the blade, shaft and handle are molded in a single operation. The disclosure illustrates the conventional wisdom of plastic when used for a snow shovel. In particular, blade flex is controlled by use of parallel spaced apart ribs in a similar manner as used with aluminum construction. However, plastic does not flex like metal; thus, the thickness of the plastic must be increased to provide sufficient strength. The shaft of the shovel also demonstrates the complications when a shaft is formed entirely from plastic by claiming a complicated cross pattern that is expensive to manufacture.

Thus, what is needed in the art is a light weight shovel having an improved plastic blade that compensates for flexing providing superior rigidity and a shaft having the rigidity of steel yet the superior properties of plastic.

SUMMARY OF THE INVENTION

The present invention satisfies this need through provision of a light weight shovel assembly having a graphite impregnated plastic blade reinforced with concavely outwardly extending ribs with a base thickness compensated by substantially perpendicular tabs formed in integral to the back surface of the ribs. A shaft made from low cost steel covered with a knurled plastic sleeve provides superior rigidity with low cost manufacturing.

As disclosed within the detailed description of the preferred embodiment, the shovel of the instant invention includes a blade constructed of a thin piece of molded plastic impregnated with graphite. The graphite forms a slick surface which is reinforced by the outwardly extending ribs and centrally disposed reinforcement tabs located along the rear surface of the ribs. A stainless steel metal skid is riveted to the leading edge of the blade to prevent premature wear of the plastic.

The shaft of the shovel is constructed from a low cost metal tube which is suitable for acceptance of a polyethylene plastic sleeve which slides over the metal tube. Heating of the plastic causes the sleeve to shrink conforming it to the tube forming a unitary shaft which prevents slippage. In this manner a low cost unfinished steel tube facilitates adhesion of the plastic. The result is a shaft having high strength with the advantages of plastic, namely, insulation from cold steel surfaces and elimination of rusting surfaces. A handle made from molded plastic is coupled to the end of the shaft providing a shovel that can be used in a conventional manner.

Thus, an objective of the instant invention is to provide a shovel blade using outwardly curved ribs with reinforcing tabs to eliminate flexing of the blade yet allow for a blade of thin thus lightweight construction for slicing through snow.

Still another objective of the instant invention is to disclose the use of a low cost, high strength shaft constructed from a steel tubing covered by a heat shrinkable plastic sleeve providing the rigidity capable only with a steel handle yet retaining the benefits of plastic.

Yet still another objective of the instant invention is to disclose the use of graphite impregnated plastic for use with snow shovels providing a high strength blade with a slippery surface.

Other objectives and advantages of this invention will become apparent from the following description taken in conjunction with the accompanying drawings wherein are set forth by way of illustration and example, certain embodiments of this invention. The drawings constitute a part of the specification and include exemplary embodiments of the present invention and illustrate various objects and features thereof.

DETAILED DESCRIPTION OF THE PREFERRED EMBODIMENTS

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

Figure 1:
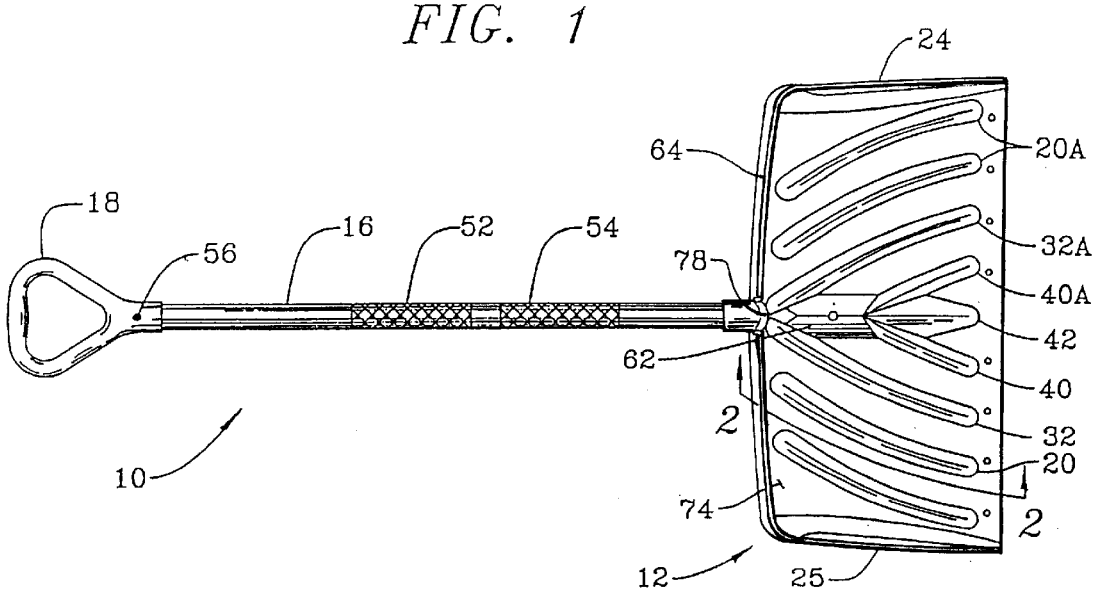
FIG. 1 is a top plane view of a first embodiment of this invention illustrating a handle, shaft, and pusher [show] *snow* blade.

Referring to FIG. 1, a front view of a *light weight, snow shovel assembly hand tool, snow tool, or shovel device comprising* pusher type snow shovel 10 is provided as a first embodiment of this invention generally defined by a rectangular pusher *plastic* blade 12 *or blade element* coupled to shaft 16 *providing a shank of metal and plastic,* and *to a plastic* handle 18 *providing a handgrip*. The blade 12 is constructed of graphite impregnated polyethylene and has a unique shape that provides high strength when minimum thickness. The blade is defined by the use of *concavely outwardly extending ribs, also referred to as outwardly curved reinforcement ribs, outboard disposed laterally spaced reinforced ribs, or* outer ribs 20 and 20A which wrap around *an* end *or upper edge of the blade* 64 and are directed from a position inward to the shaft 16 and extend outward to the *sidewalls providing lateral sides with lateral edge or* side edges 24 and 25 of the blade [terminating] *and terminate* before *the blade's lower edge, also referred to as the blade's leading edges or* end edge 28. It should be noted that the blade depicted in FIG. 1, further shown in FIG. 2, forms a large curvature which the ribs follow. The ribs on either side of the center of the shovel blade, as defined by the location of shaft placed between lateral sides 24 and 25, form a mirror image of the other side. Outwardly curved reinforcement ribs provide support to the blade in both a lateral and horizontal position. The ribs project upwardly from *the* front surface 74; *also referred to as an upper surface, or inner surface,* and are defined as having at least two outboard disposed laterally spaced reinforced ribs 20, 20A formed concavely upward in the upper surface 74 of the blade extending outwardly between the upper edge 64 and the lower edge 28 gradually increasing in depth from a minimum depth adjacent the upper edge and the lower edge to about one inch depth; inboard disposed laterally spaced reinforced ribs 32 and 32A formed concavely upward in the upper surface 74 of the blade extending outwardly between the center of the blade to the lower edge 28 gradually increasing in depth from a minimum depth adjacent to the upper edge 64 and the lower edge 28 to about one inch depth; and a center reinforced rib 42 formed concavely upward in the upper surface 74 of the blade and extending outwardly from the center of the blade to the lower edge 28 gradually increasing in depth from a minimum depth adjacent the lower edge 28 to a depth of about one inch forming an end of the coupling joint 62, *also referred to as a shaft coupler, shaft coupling, or shaft attachment* for the shaft 16.

The *shaft on* shank 16 is shown coupled to the blade having two knurled surfaces 52 and 54, *also referred to as knurled hand grip surface* providing the operator with a handgrip location so as to help prevent a loosely gripped shank from sliding out of the operator's grasp. The handle 18 is molded from a single piece of plastic and includes a handgrip which is fixed to the shaft 16 by means of at least one screw 56.

Figure 2:
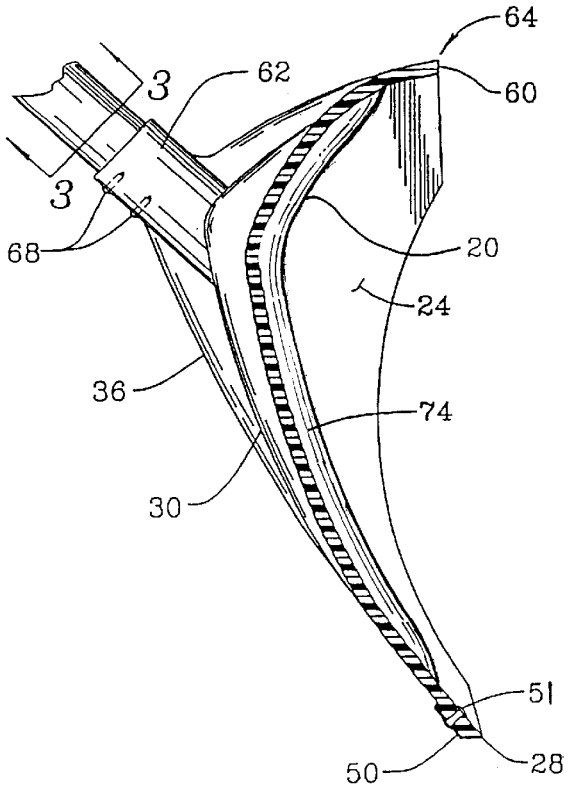
FIG. 2 is a partial cross-sectional side view of FIG. 1 taken along lines 2—2.

Now referring to FIG. 2 a cross-sectional side view of the pusher shovel illustrates the use of reinforcement tabs 30 and 36 which are operatively associated with the ribs 20 and 32 respectively. FIG. 2 is taken along lines 2—2 as shown in FIG. 1. The ribs extend outward from the *base or* shell 60 of the blade approximately one-inch along shaft coupler 62 and taper into the base 60 along the leading edge 28 and upper edge 64. By use of reinforcing ribs, as further defined in this specification, the thickness of the base 60 can be reduced accordingly. Tab 36 which is found within rib 32 is enlarged and actually molds into the shaft coupling 62 while tapering to a point of being flush with the base 60 near leading edge 28 as well as upper edge 64. The enhanced curvature of the pusher shovel allows snow to roll within the front surface 74 of the shovel formed into a cavity keeping snow within the confines of the shovel blade and side edges 24 and 25. The curve allows for a maximum throw of snow while used in its design mode of pushing the snow. The blade has graphite impregnated material making the surface of the shovel slippery which helps avoid snow from sticking to the surface.

A stainless steel wear strip 50 *also referred to as a metal skid, stainless steel wear edge, stainless steel wear blade, steel protector or metal reinforcement strip, provides a wear resistant edge which* is secured to the *lower* edge 28 of the shell 60 by use of rivets [52] *51* to prevent premature wear normally associated with polyethylene shovel blades. The *blade's lower* edge 28 is slightly enlarged so that the wear strip 50 will encompass the edge to prevent disengagement. The shaft 16 is coupled to the blade at coupling adapter 62 by self-taping stainless steel screws 68.

Figure 3:
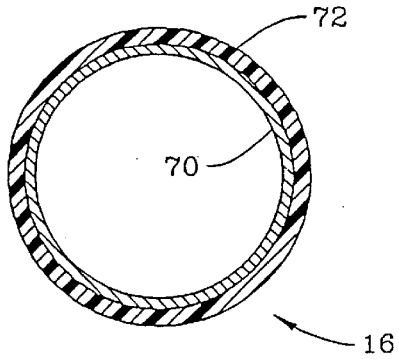
FIG. 3 is a cross-sectional view of the shaft as shown in FIG. 2 and taken along lines 3—3.

A cross-sectional end view of the shaft 16 is provided in FIG. 3 as taken across lines 3—3 of FIG. 2. The shaft 16 consists of metal pipe 70 preferably made of galvanized steel tubing which is encompassed by a plastic polyethylene sleeve *or tube* 72 which is installed over the pipe 70 and subjected to heat causing the plastic tube 72 to shrink and conform to the pipe 70.

Figure 5:
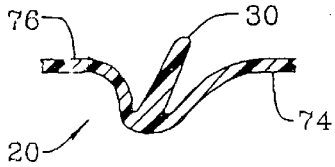
FIG. 5 is a cross-sectional view of a rib shown in FIG. 4 and taken along lines 5—5.
Figure 4:
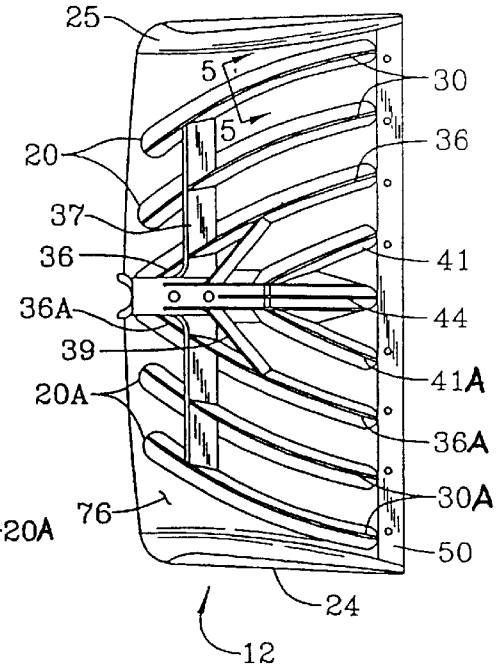
FIG. 4 is a rear plane view of the blade shown in FIG. 1.

Now referring to FIG. 4, the rear of the shovel is shown illustrating reinforcement of the ribs illustrated in FIG. 1. Reinforcement tabs 30 and 30A extend along the center of ribs and project outwardly along the backside *also referred to as the back surface, bottom surface or rear surface* 76 of the blade anywhere from a quarter of an inch to one inch in height. The use of the tab is repeated in the ribs providing structural integrity to the blade by duplicating a blade having a thickness corresponding to the tab without the need of having the entire blade made of that thickness. Ribs 32 and 32A project from the base of the shaft attachment 62 and project outwardly to the leading edge 28 of the blade curving towards each side edge 24 and 25 respectively. The centrally placed ribs provide reinforcement to the edge of the blade in those instances where the shaft is forced into the blade due to striking a non-moving object. As previously mentioned the ribs 20 and 32 include reinforcement tabs 30 and 36 respectively which are formed integral to the rib and project outwardly so as to provide structural integrity in the lateral plane so as to eliminate flexing of the blade. Similarly ribs 40 [and], 40A *and 42* have tabs 41 [and], 41A *and 44* respectively propagating from the middle of the shovel blade to the leading edge 28. Cross tab 37 interconnects the enlarged portion of the tabs along the curvature of the blade. Tabs 39 provide particular reinforcement to tabs 36 and 36A for position reinforcement when pushed against rigid material. The metal reinforcement strip 50 is shown secured to the front edge 28 of the blade providing a wear resistant edge for use on pavement. FIG. 5 illustrates a cross-sectional view of rib 20 wherein the front surface 74 of the blade material 60 is raised from a flat plane anywhere from a quarter of an inch to 1½ inches in height. The rear surface 76 illustrates tab 30 centrally disposed within the concave portion of the rib 20 along the back surface 76. The tab 30 is angularly formed toward the center of the shovel providing rigidity to the blade and eliminating flex under heavy load. The tabs allow the use of a thinner sidewall thickness yet further prevent the blade from folding or collapsing under adverse conditions.

Figure 6:
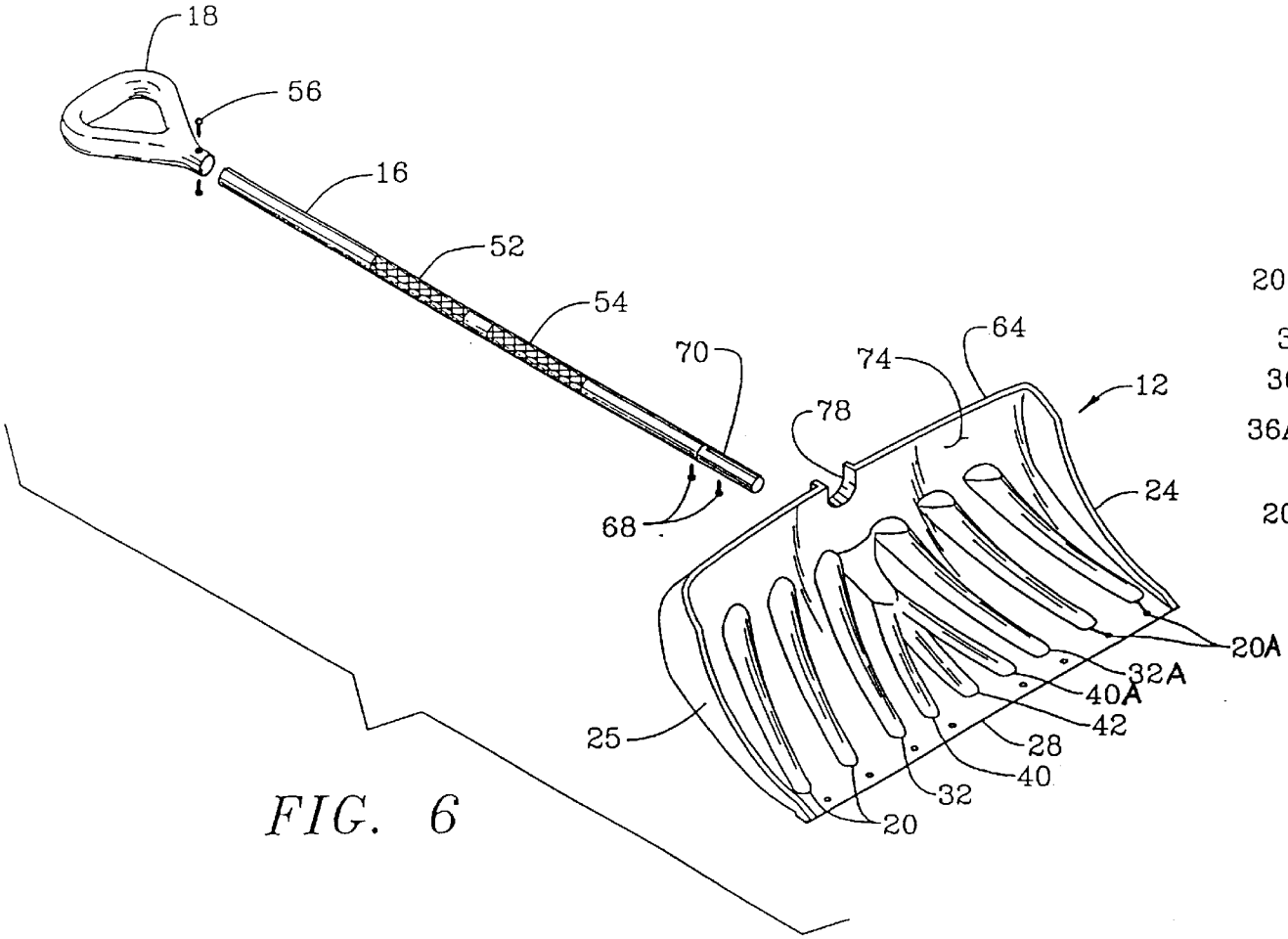
FIG. 6 is an exploded perspective view of FIG. 1.

FIG. 6 illustrates the pusher type blade 12 in an exploded perspective view. The blade 12 inner surface 74 defines a partial bucket having sidewalls 24, 25, leading edge 28, and upper edge 64. The upper surface of the blade illustrates the ribs 20, 32, 40, and mirror image *ribs or* counterparts 20A, 32A, 40A, and center rib 42. Along the upper edge 64 is a semicircular opening 78 which facilitates storage and shipping of the device when placed in an upright position wherein the opening 78 will accommodate the shaft of a similarly shaped shovel allowing the blades to nest thereby providing a type of inter-lock for shipping or display. The *shaft or shank, which is also sometimes referred as a* handle 16 is illustrated with plastic sleeve 72 placed over the majority of the steel pipe 70. The pipe 70 is the same length as the sleeve 72. Mounting screws 68 are available for attaching the shaft 16 to the blade 12. Similarly *handgrip or* handle 18 is shown in position for attachment to the other end of the shaft 16 with screws 56 available for securing to the shaft.

Figure 8:
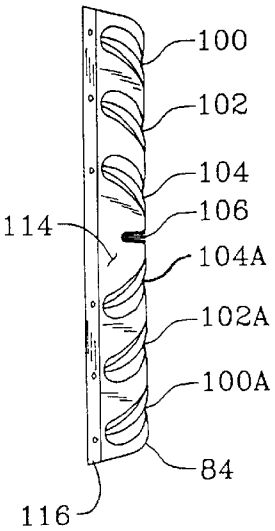
FIG. 8 is an end view of FIG. 7.
Figure 7:
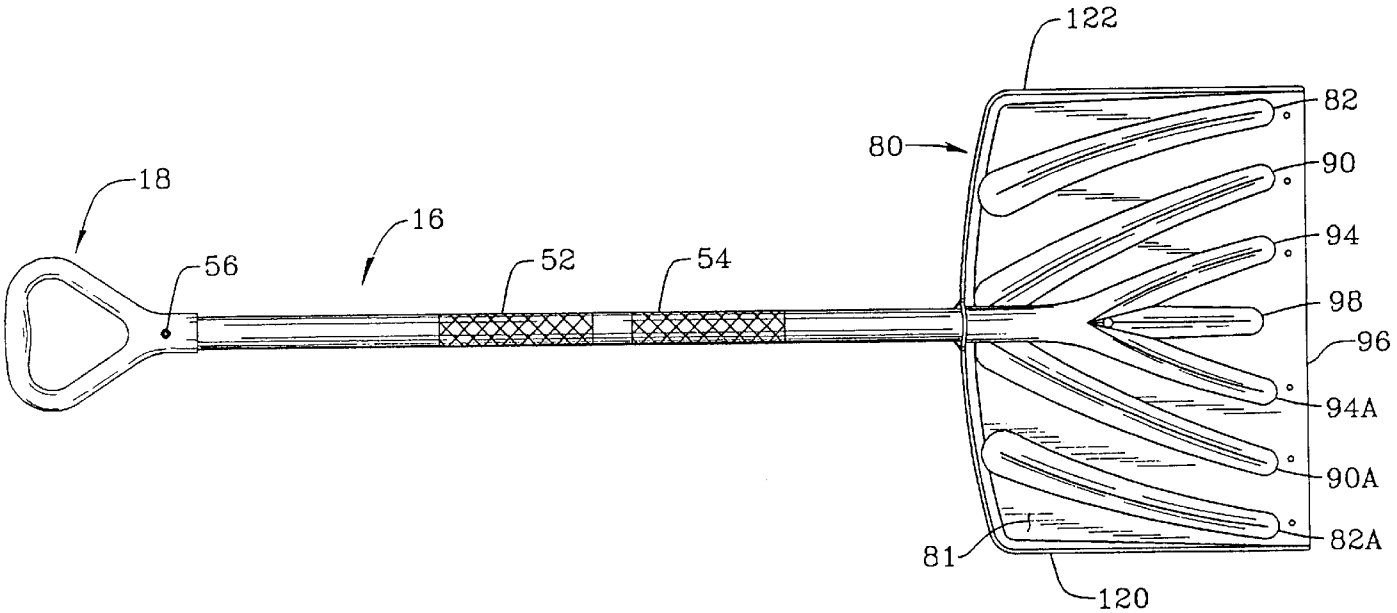
FIG. 7 is a top plane view of a second embodiment of this invention illustrating a handle, shaft, and flat snow blade.

FIG. 7 sets forth an alternative embodiment of the *light weight shovel assembly or shovel device of the* instant invention by disclosing a flat blade snow shovel 80. In a similar fashion to the aforementioned pusher blade shovel, the instant invention utilizes the *shank or* shaft 16 with the *metal tube comprising a steel pipe within a plastic* polyethylene sleeve 72 and knurled handle grip surfaces 52, 54. The handle 18 *or handgrip* is similarly attached to the shaft 16 by attachment screw 56. In this embodiment blade 80 *or blade element* is substantially flat having *an upper surface or* front surface 81, outer ribs 82, 82A and inner ribs 90, 90A. Partial ribs 94 and 94A and straight rib 98 provide frontal edge 96 support in the same manner as the previously described pusher blade. The end view of FIG. 8 illustrates the reinforcement tabs along the *rear surface or* bottom surface 84 of the blade. Thus tabs 100 and 100A are formed integral to *concavely outwardly extending ribs, also referred to as outwardly curved reinforcement ribs, outboard disposed laterally spaced reinforced ribs, or* ribs 82 and 82A; tabs 102 and 102A are formed integral to ribs 90 and 90A; and tabs 104 and 104A are formed integral to ribs 94 and 94A respectively. Center support rib 98 has tab 106 molded thereto. As with the pusher blade, a stainless steel skid 116 *also referred to as a metal skid, steel protector metal reinforcement strip, stainless steel wear edge, or stainless steel wear blade provides a wear resistant edge which* is coupled to the blade to prevent premature wear.

Figure 9:
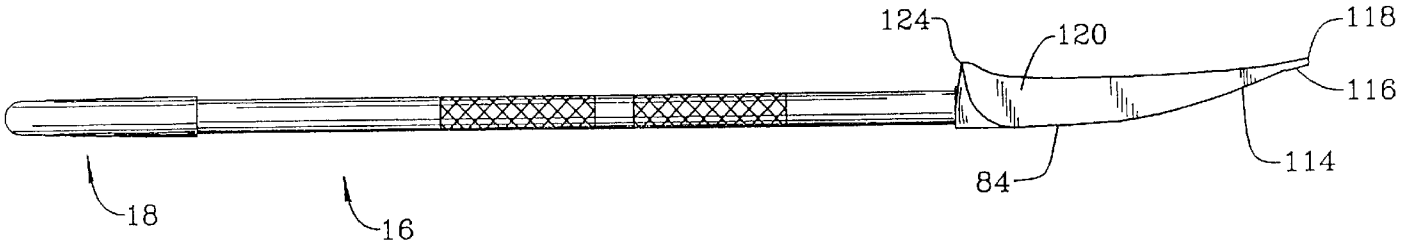
FIG. 9 is a side view of FIG. 7.

Now referring to FIG. 9 a side view of the straight blade shovel illustrates the blade 80 having a substantially flat bottom surface 84 with sloped surface portion 114 leading to the stainless steel protector 116 placed along the *lower edge or* leading edge 118 of the blade. The blade 80 has *sidewalls providing lateral sides with lateral edges or* side edges 120 and 122 and *an upper edge or* rear lip 124 to help maintain snow within the *blade providing the* scoop during transfer.

It is to be understood that while we have described certain forms of our invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What I claim is:

1. A shovel device comprising: a generally rectangular blade element constructed of plastic having an upper surface and a bottom surface, upper and lower edges and first and second [generally parallel] lateral edges with a centrally disposed coupling projecting outwardly and bifurcating said upper surface and said bottom surface, said upper surface having at least two outboard disposed laterally spaced reinforced ribs formed concavely upward in said upper surface of said blade element extending outwardly between said upper edge and said lower edge gradually increasing in depth from a minimum depth adjacent said upper edge and said lower edge to about one inch depth; inboard disposed laterally spaced reinforced ribs formed concavely upward in said upper surface of said blade element extending outwardly between the center of said blade element to said lower edge gradually increasing in depth from a minimum depth adjacent said upper edge and said lower edge to about one inch depth; a center reinforced rib formed concavely upward in said upper surface of said blade element extending outwardly from the center of said blade element to said lower edge gradually increasing in depth from a minimum depth adjacent said lower edge to a depth of about one inch [forming an aperture opening coupling joint]; a stainless steel wear edge coupled to said lower edge; a shaft constructed from a steel tube having a plastic sleeve, said shaft insertable into said coupling [joint] of said blade element; and a handle molded from a single piece of plastic having an opening formed at one end for insertion of a free end of said shaft.

2. The shovel device according to claim 1 wherein said blade element is constructed of graphite impregnated plastic.

3. The shovel device according to claim 1 wherein said plastic sleeve is constructed of polyethylene that conforms to said steel tube upon receipt of heat.

4. The shovel device according to claim 3 wherein said plastic sleeve is knurled along a portion thereof.

5. The shovel device according to claim 1 wherein said upper edge of said blade element includes a semicircular opening sized to receive a shaft from a like shovel device.

6. The shovel device according to claim 1 wherein each said reinforced rib includes a tab centrally disposed and formed integral along a bottom surface of said rib.

7. The shovel device according to claim 6 wherein said tab has a base formed perpendicular to each said rib and an upper portion angled toward the center of said blade element.

8. The shovel device according to claim 1 wherein said rectangular blade element is generally planar.

9. The shovel device according to claim 1 wherein said rectangular blade element is curved wherein said upper edge projects over said top surface.

10. A shovel device comprising: a generally rectangular blade element constructed of graphite impregnated plastic having an upper surface and a bottom surface, upper and lower edges and first and second [generally parallel] lateral edges with a centrally disposed coupling projecting outwardly and bifurcating said upper surface and said bottom surface, said upper surface having at least two outboard disposed laterally spaced reinforced ribs formed concavely upward in said upper surface of said blade element extending outwardly between said upper edge and said lower edge gradually increasing in depth from a minimum depth adjacent said upper edge and said lower edge to about one inch depth; inboard disposed laterally spaced reinforced ribs formed concavely upward in said upper surface of said blade element extending outwardly between the center of said blade element to said lower edge gradually increasing in depth from a minimum depth adjacent said upper edge and said lower edge to about one inch depth; a center reinforced rib formed concavely upward in said upper surface of said blade element extending outwardly from the center of said blade element to said lower edge gradually increasing in depth from a minimum depth adjacent said lower edge to a depth of about one inch [forming a coupling joint]; a tab centrally disposed and formed integral along a bottom surface of each said rib; [a stainless steel wear blade coupled to said lower edge;] a shaft constructed from a steel tube [slidably insertable into] *positioned in* a polyethylene sleeve, said shaft insertable into said coupling [joint] of said blade element; and a handle molded from a single piece of plastic having an opening formed at one end for insertion of a free end of said shaft.

11. The shovel device according to claim 10 wherein said sleeve is knurled along a portion thereof.

12. The shovel device according to claim 10 wherein said upper edge of said blade element includes a semicircular opening sized to receive a shaft from a like shovel device.

13. The shovel device according to claim 10 wherein said rectangular blade element is generally planar.

14. The shovel device according to claim 10 wherein said rectangular blade element is curved wherein said upper edge projects over said top surface.

* * * * *